United States Patent [19]

Pruett

[11] 4,170,114

[45] Oct. 9, 1979

[54] RECIRCULATING SUBMERSIBLE TURBINE

[76] Inventor: Robert L. Pruett, Rte. 2, Box 69, Gardnerville, Nev. 89410

[21] Appl. No.: 857,635

[22] Filed: Dec. 5, 1977

[51] Int. Cl.² ............................................. F03B 13/10
[52] U.S. Cl. ...................................................... 60/496
[58] Field of Search ...................... 60/496; 415/5, 7, 8

[56] References Cited

U.S. PATENT DOCUMENTS

| 7,657 | 7/1833 | Spafford | 60/496 |
|---|---|---|---|
| 190,923 | 5/1877 | Sparrow | 60/496 |
| 211,143 | 1/1879 | Fogarty | 60/496 |
| 650,063 | 5/1900 | Kersten | 60/496 |
| 4,095,426 | 6/1978 | Rhodes | 60/496 |

*Primary Examiner*—Allen M. Ostrager
*Attorney, Agent, or Firm*—Townsend and Townsend

[57] ABSTRACT

A turbine wheel having a central hollow cylindrical water tight shell is encased in a closely fitting cylindrical housing filled with water. The circumference of the wheel carries a plurality of chambers defined by vanes, each vane having a radial flat portion for propelling water tangentially in the direction of rotation of the wheel. Gas is injected near the bottom of the wheel. The buoyant force of trapped gas in the chambers imparts rotation to the wheel, and water displaced by the injected gas circulates in the region between the ends of the vanes and the housing. An external conduit may facilitate efficient replacement by receiving some of the displaced water near the bottom and reintroducing it near the top of the housing.

6 Claims, 5 Drawing Figures

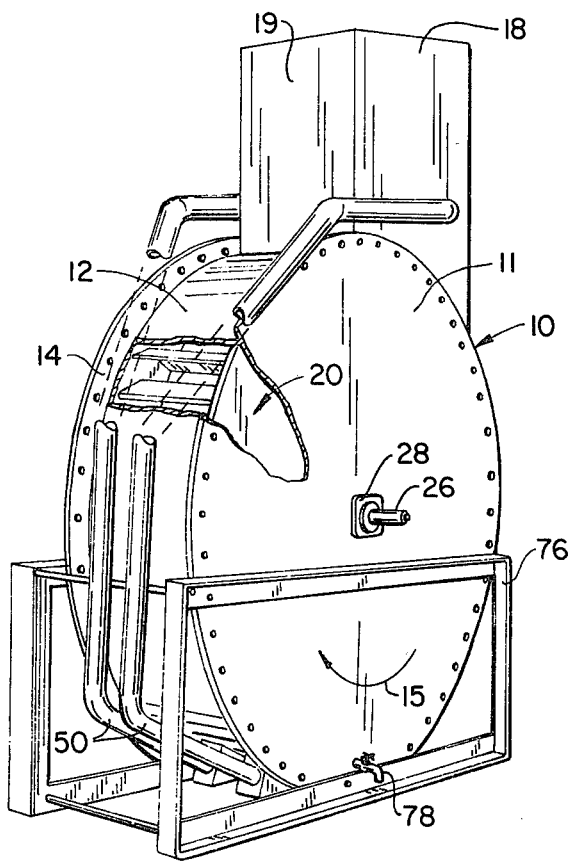
FIG._1.
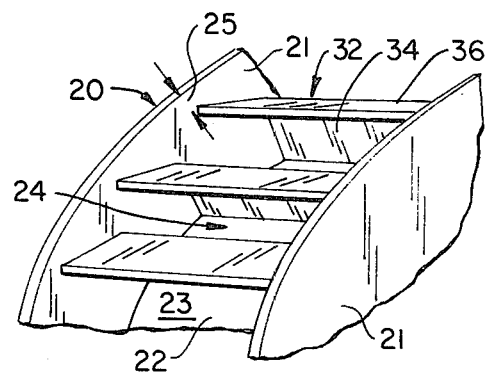
FIG._2.
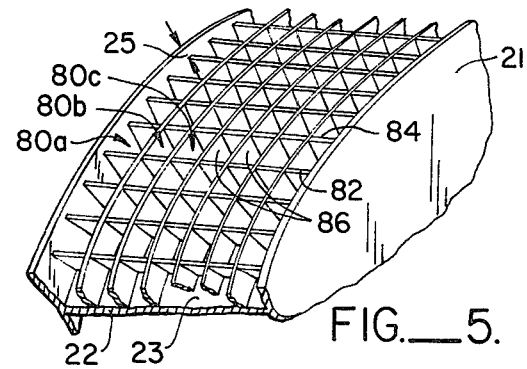
FIG._5.
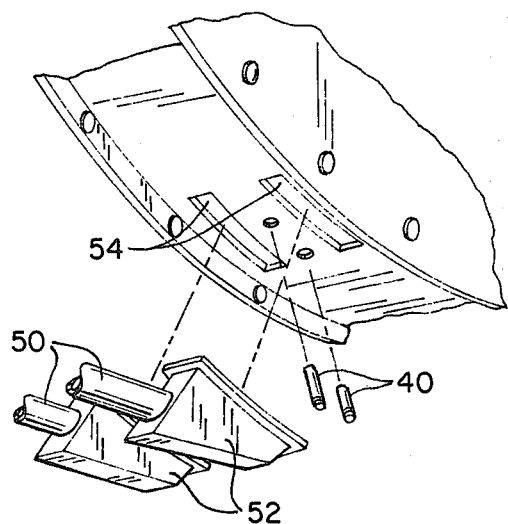
FIG._4.
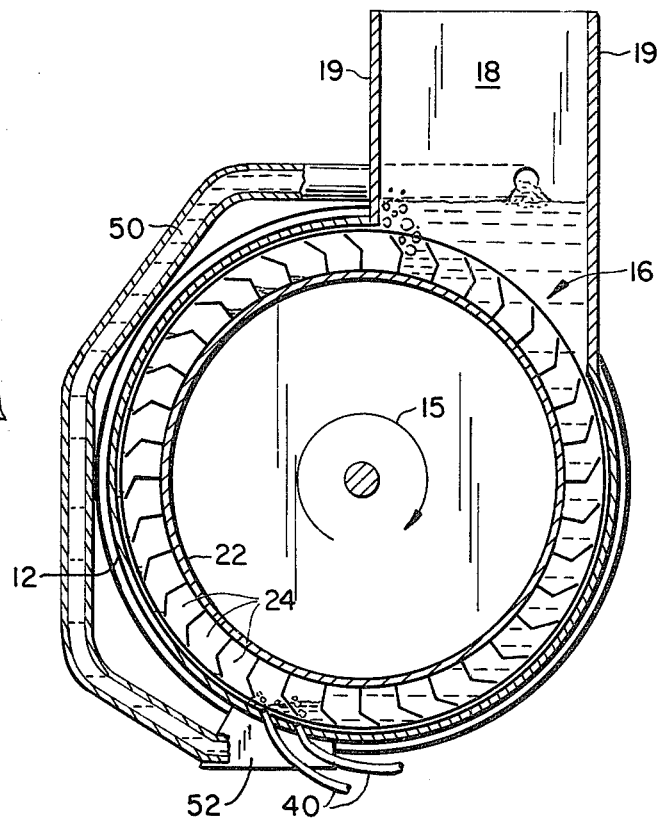
FIG._3.

RECIRCULATING SUBMERSIBLE TURBINE

BACKGROUND OF THE INVENTION

Submersible turbines running on compressed gas, typically air, are known. See for example U.S. Pat. No. 272,656 to Cook, U.S. Pat. No. 271,040 to Cook, and U.S. Pat. No. 211,143 to Fogarty. Since turbines of this type run on low pressure gas, they are suitable for extracting energy from sources (e.g. low pressure gas wells) that are not otherwise useful. Moreover, such turbines are especially suited for use in environments where electric and combustion engines would be unsafe (e.g., in the presence of explosive gases). The compressed air used to run the turbine may also be used to provide necessary ventilation. However, prior art devices present several problems.

First, the submerged wheel is often provided with a housing that affords substantial clearance between the wheel and the housing at some point along the circumference. This large clearance results in the escape of air in the form of large bubbles that are released as the turbine wheel rotates. Once the air is clear of the turbine wheel, the upward motion of the air pocket is no longer available for driving the wheel. Moreover, as large amounts of water flow in to replace the air, large scale turbulence is created which extends to the surrounding water. In this manner, the efficiency of the turbine is reduced as energy is dissipated in the surrounding water. The uncontrolled influx of replacement water also causes local turbulence which produces vibrations of the turbine. The vibration both represents a loss of useful mechanical energy output and may even render the turbine output unsuitable for certain applications.

Second, typical prior art devices use a wheel submerged within a large tank of water. This results in an extremely heavy machine, possibly unsuitable for installation in existing structures. If a specially designed vessel is used, as for example a sunken well, the turbine cannot readily be moved from one location to another. Aside from the large amount of water that is required to initially put one of these turbines into operation, the large tank represents a substantial cost for material and fabrication.

A third difficulty with prior art devices relates to loading on the axle bearings due to the weight of the wheel. Excessive loading leads to frictional losses and possible ultimate failure of the bearings themselves.

A fourth difficulty with submersible turbines running on compressed air is the considerable fluid shear generated at the tips of the vanes. This represents a further loss as turbulence is set up in the surrounding water. The use of a closely-fitting housing to reduce these losses tends to localize the shear forces and thus puts an added strain on the turbine wheel.

A fifth difficulty encountered with the prior art devices involves frictional losses between the downward moving side of the turbine wheel and the water through which it moves. The turbulence set up causes vibrations which reduces the efficiency of the turbine. Prior art turbines typically use curved, back-swept vanes to cut down viscous drag and to provide more effective air entrapment. This type of vane tends to displace water outward which can cause additional turbulence.

A sixth difficulty with the prior art submersible turbines relates to the water replacement when the upwardly moving air leaves the vicinity of the rotating turbine wheel. The inflow of water tends to be relatively non-directional and therefore often acts in a direction opposite that in which the wheel is rotating. Again, the result is a reduction in the energy output of the turbine and increased vibration.

SUMMARY OF THE INVENTION

A turbine wheel is encased in a closely-fitting cylindrical housing filled with water. The outside of the housing is exposed to the air. The center of the wheel is a hollow cylindrical water-tight shell. Thus, the wheel tends to float, thereby reducing downward loading on the axle bearings. The use of a hollow wheel within a closely fitting housing also results in a rather small total volume of water being used.

The circumference of the wheel is fitted with a plurality of chambers defined by vanes, each vane having a radial flat portion that tends to propel water tangentially following the direction of rotation of the wheel. Each vane may also have a backswept portion that improves the air trapping capability of the chambers. Gas, typically air, is injected near the bottom of the wheel, just beyond the bottom of the housing. The buoyant force of the air trapped in the chambers imparts a rotational motion to the wheel. An opening near the top of the housing, surrounded by four upwardly extending vertical walls, allows the air to escape and prevents the displaced water from overflowing.

The water displaced by the injected gas circulates in the region between the ends of the vanes and the housing. Efficient displacement may be aided by providing an external conduit. Some of the displaced water passes into the conduit which runs along the outside of the housing, the conduit reintroducing the water near the top of the wheel where the trapped gas is released, thereby aiding the efficient replacement of water. In this fashion, an overall circulation of water is obtained. The circulation leads to less relative motion between the wheel and the water with consequentially decreased friction and turbulence.

OBJECTS AND ADVANTAGES OF THE INVENTION

It is an object of this invention to disclose a submersible turbine wherein losses due to turbulence in the surrounding water are minimized. This is accomplished by providing a closely-fitting housing surrounding the turbine wheel.

An advantage of using a closely-fitting housing is that air which is entrapped in the chambers and then escapes as the wheel rotates is prevented from leaving the vicinity of the turbine vanes by the housing. Thus, the upwardly moving vanes are operating in an environment that is mainly air and thus there is less viscous drag on the turbine wheel due to water at the end of the vanes.

Another advantage of using a closely-fitting housing is that the air, by being kept in the vicinity of the turbine vane, is able to exert its lift fully, thereby increasing the efficiency of the turbine.

A further advantage of using a closely-fitting housing as the sole means of containing the water for the operation of the turbine is a decrease in the amount of water which leads to a lighter, smaller device.

It is an object of this invention to disclose a submersible turbine wherein the load on the axle bearings is decreased. This is accomplished by using a hollow wheel which is buoyed up by the water surrounding it.

By adjusting the weight of a given size wheel, neutral buoyancy may be achieved.

An advantage of using a hollow wheel is that friction losses in the bearings are minimized and premature bearing failure due to excessive loading is reduced.

Moreover, less water is necessary for the operation of the turbine. This results in a turbine of reduced weight.

It is another object of this invention to disclose a submersible turbine wherein shear forces at the ends of the downwardly moving turbine vanes are reduced. A close housing is employed, and the wheel is provided with vanes which tend to propel the water in a tangential manner following the direction of rotation. In order to ensure that the downardly moving water at the outer portion of the downwardly moving side of the turbine wheel circulates freely with the wheel, an upward circulation on the upwardly moving side of the wheel is maintained in the region between the ends of the vanes and the inner surface of the housing. An external conduit for the displaced water may be provided, the external conduit leading to a point near the top of the wheel so that the displaced water circulates upwards and is reintroduced.

An advantage of using a circulating water mode is that friction between the downwardly moving vanes and the water surrounding them is less than in the case of static water, due to the reduced relative motion. Also, the orderly escape of air near the top of the wheel results in less vibration and turbulence due to inrushing water.

An advantage of using an external conduit to take up the displaced water is that the displaced water freely flows through the regularly shaped smooth conduit. The external conduit avoids the problems caused by circulating too much water in the region between the upwardly moving vanes and the housing. Thus excessive velocity of the upwardly moving water, and back pressure on the downwardly moving water is reduced.

BRIEF DESCRIPTION OF THE DRAWINGS

FIG. 1 is an overall perspective view of the turbine, partially cut away to show the wheel.

FIG. 2 is a fragmentary perspective view of the chambers located on the circumference of the turbine wheel.

FIG. 3 is a cross-sectional view of the turbine, to show the relationship between the air injectors and the bypass conduit.

FIG. 4 is an exploded perspective view of the bottom portion of the housing showing the air injectors and the bypass conduit inlets.

FIG. 5 is a fragmentary perspective of an alternate embodiment of the turbine wheel, especially adapted for use without a bypass conduit.

DESCRIPTION OF THE PREFERRED EMBODIMENT

FIG. 1 is a perspective view showing the major components of the turbine including housing 10 and wheel 20. The outer housing 10 of the turbine is made up of circular side plates 11 spaced apart by central cylindrical shell 12. For a cylindrical shell having a 48-inch inner diameter, 52-inch diameter steel side plates approximately $\frac{1}{8}$-inch thick are suitable. They are spaced apart by approximately 14 inches. Flanges 14 are welded to the edges of cylindrical shell 12 to allow the shell to be bolted to the side plates. A 2-inch wide, $\frac{1}{4}$-inch thick neoprene gasket is interposed between flanges 14 and side plates 11 to provide a water-tight seal. Approximately 50 bolts hold cylindrical shell 12 to each side plate 11.

An opening 16 extends across housing 10, the opening having an axial dimension approximately equal to that of the cylindrical shell 12. Opening 16 is surrounded by vertical side walls 18 parallel to side plates 11, and vertical walls 19 perpendicular to side walls 18, that prevent water from overflowing out of opening 16. In the preferred embodiment, opening 16 extends from a point near the top of the housing to a point approximately 18 inches past the top of the housing. (For convenience, displacements along the circumference of housing 10 or wheel 20 will be assumed to be along the direction of rotation of wheel 20 as shown by arrow 15.) A plurality of baffles may be provided within the upwardly extending chamber defined by walls 18 to aid in the separation of air and water.

Outer housing 10 is shown partially cut away to reveal a portion of turbine wheel 20 which is coaxial with housing 10. As seen in FIG. 2, turbine wheel 20 comprises wheel discs 21 and a relatively large cylindrical shell 22, the circumferential surface 23 of which is covered with a plurality of chambers 24. Wheel discs 21 and cylindrical shell 22 are welded together to provide a hollow, water-tight wheel core. Wheel 20 is provided with a $\frac{3}{4}$-inch shaft 26 that extends axially in both directions. Shaft 26 is supported from side plates 11 by bearings 28. Wheel discs 21 have a diameter as close to the inner diameter of housing 10 as is practical. A typical clearance is $\frac{1}{8}$-inch. In the preferred embodiment, wheel discs 21 extend beyond cylindrical surface 23 by a distance corresponding to the depth of the chambers 24 increased by a specified distance 25, typically $\frac{1}{2}$-inch, to provide a circulation region. A chamber depth of approximately 6 inches for a wheel core having an outer diameter of 34.75 inches is suitable.

In addition to the wheel disc extensions beyond cylindrical surface 23, chambers 24 are defined by vanes 32. Each vane 32 has a radial portion 34 extending part of the distance from cylindrical surface 23 to the outer edge of side plate 21, and a backswept portion 36 extending outward angularly from the end of straight portion 34 to within distance 25 of the circumference of the wheel discs. For the dimensions of the wheel described above, sections 34 and 36 are both 4 inches by approximately 13 inches (the width of the wheel). There are 30 chambers around the circumference of the wheel. The vanes are made of a relatively thin material such as 1/16-inch iron.

Referring to FIGS. 1, 3, and 4, air injectors 40 and bypass conduits 50 can be seen. In the preferred embodiment, there are two air injectors located centrally on cylindrical shell 12 at 5 inches and 10 inches circumferentially past the bottom of the housing. Pipe having an inner diameter of $\frac{1}{2}$-inch is suitable. A bypass conduit is on each side of the line between air injectors 40. Each bypass conduit 50 extends from its own bypass inlet 52, up along the outside of housing 10, and to a point above and past the top of housing 10, where it passes into side wall 18.

FIG. 4 shows more closely the arrangement of injectors 40, bypass conduits 50, and bypass inlets 52. Each bypass inlet 52 covers an opening 54 in cylindrical shell 12. Each opening 54 is generally rectangular in shape with an overall dimension of 3 inches axially by 10 inches circumferentially. Each opening 54 extends from 0.75 inches from the edge of cylindrical shell 12 to 3.75 inches from the edge, and from 4.25 inches to 14.25 inches past the bottom of cylindrical shell 12.

The entire assembly is supported in stand 76 which also prevents side plates 11 from bowing out relative to one another due to water pressure within the housing. A drain 78, typically ½-inch, is provided for emptying the water out of housing 10.

Having thus set forth the overall construction of the turbine, the operation can be described. In use, housing 10 is filled with water while cylindrical core 22 remains filled with air. Thus a relatively small volume of water is actually used, since the major portion of the housing is filled with the wheel core. Due to the buoyant force on wheel 20, the downward loading on bearing 28 is relieved.

When air, as for example, from a compressor, is injected through air injectors 40, it begins to fill those chambers 24 that are nearest the injectors. Water displaced by the injected air flows into intake conduit 52 and out bypass conduit 50. The buoyant force acting on the trapped air in chambers 24 causes the wheel to rotate. As the wheel rotates, the air-filled chambers, upon nearing the top of the wheel, are facing upward and release their air. The released air is replaced by the water contained by walls 18 and 19 and the water from bypass conduits 50.

Not all the water displaced by the injected air passes through bypass conduits 50. Some of it circulates upward in the region bounded radially by the ends of vanes 32 and the inner surface of cylindrical shell 12, and axially by the radially outermost portions of wheel discs 21. This is the volume provided by clearance dimension 25.

Due to the small clearance between wheel 20 and housing 10, the chambers 24 on the upwardly moving side of the wheel tend to remain filled with air until they reach the top of the wheel. Since they are moving in a region substantially free of water, they are essentially free of viscous drag. The small clearance tends to have a similar effect on the downwardly moving sides of the wheel, where the wheel is operating in a region substantially free of air. The vanes, each with its flat radial portion, tend to propel the water forward in a tangential manner following the rotation of the wheel. Thus, an overall circulation of the water is set up. On the downwardly moving side the circulation is maintained by having the chambers filled with water being propelled forward by the wheel. On the upwardly moving side of the wheel the water has been displaced into bypass conduit 50 and into the peripheral region of the housing where it flows smoothly.

The amount of water that circulates in the bypass conduit relative to the amount that circulates in the housing itself depends in part on the chamber depth relative to clearance dimension 25.

FIG. 5 is an embodiment of the turbine wheel suitable for use in a turbine where the housing is not provided with a by-pass conduit. Rather than having a single chamber extending axially across the wheel, a plurality of smaller abutting chambers is provided. A given axial row of chambers, including chambers 80a, 80b and 80c, is defined by radial vanes 82 and 84, a plurality of annular segments 86, and outer core surface 23. The entire wheel comprises a plurality of abutting axial rows of this sort. Vanes 82 and 84, and annular segments 86 are thin material such as 1/16-inch galvanized steel. The chambers are typically 2 inches deep, and 2 inches along the circumference of wheel 20. Since these dimensions are small compared to the wheel diameter, the chambers are approximately rectangular and it is convenient to refer to them as such. The axial dimension of the chamber is approximately 2 inches, in which case the chambers are cubical.

For the embodiment of the turbine making use of a wheel of this sort, an air injection manifold must be provided with an injector corresponding to each chamber in a given axial row. Thus for a wheel having 7 chambers axially across the wheel, a 7 injector manifold is appropriate.

Since no bypass conduit is provided, the turbine of this embodiment relies on setting up the circulation of water in the outermost peripheral region of housing 10, that is the region between the upwardly moving wheel and the inner surface of cylindrical shell 12. The water in this region would tend to be moving faster than the wheel in order to maintain the circulation.

The use of multiple chambers in a given axial row rather than a single chamber extending the axial width of the wheel was motivated by a desire to eliminate the sideways turbulence of water which would displace air prematurely up along the circular sides 21 of the wheel.

Typical performance for a turbine having the dimensions and construction described herein is an output shaft velocity of 25 rpm with air input from a 120 volt, 1.25 amp compressor having an output of 30 cfm at 3 psi. The output shaft was capable of lifting 200 pounds a distance of 12 inches in 9 seconds.

A sprocket and chain arrangement for power transmission has been found preferable to a belt and pulley system since the latter subjects the output shaft to severe sideways forces necessary to provide adequate friction for the belt. The effect of such sideways loading was a decrease of the output rpm by a factor of 2.

What is claimed is:

1. In a turbine having a wheel with a plurality of chambers on its periphery, the wheel being submerged in liquid, wherein gas injected into the liquid below the wheel becomes entrapped in the chambers on one side of the wheel, imparting buoyant lift to those chambers and causing the wheel to rotate, an improved wheel and housing comprising: a cylindrical housing having an inner diameter and enclosing the wheel, the housing having an opening at the top thereof for the gas to escape; gas injection means near the bottom of the housing; a hollow cylindrical wheel shell having an outer surface defining a wheel shell outer diameter, the wheel shell having first and second open ends; means covering the first and second open ends, forming a hollow liquid-tight assembly, whereby the wheel is buoyed up by the liquid; a plurality of vanes extending outwardly from the outer surface of the hollow cylindrical wheel shell, each of the vanes having a flat portion perpendicular to the outer surface, the vanes defining a vane diameter which exceeds the wheel shell diameter by a chamber depth; and first and second annular members extending from the outer surface of the wheel shell to a wheel diameter at least the vane diameter wherein the vanes and said annular members define the chambers; the inner housing diameter and the vane diameter defining a clearance substantially less than the depth of the chambers, wherein the gas injected into the housing displaces liquid and wherein the vanes push water tangentially in a direction following the direction of rotation such that at least some displaced water circulates upward in the clearance region between the housing inner surface and the vane diameter.

2. The turbine of claim 1 also comprising conduit means exterior of the housing communicating a region inside said housing proximate the air injection means with a region in the housing proximate the opening at the top thereof, whereby gas injected into the housing by the gas injection means causes some water to be displaced into the conduit means wherein the water circulates and is reintroduced into the housing near the opening at the top of the housing.

3. The turbine of claim 1 wherein the annular members have an outer diameter in between the vane diameter and the housing inner diameter and the annular member outer diameter is substantially closer to the inner diameter than to the vane diameter.

4. The turbine of claim 1 wherein the first open end covering means and the first annular member are an integral disc.

5. The turbine of claim 1 wherein the vanes are entirely flat and wherein the wheel also comprises a plurality of annular segments between the annular members and bounded by the vanes to define an array of generally rectangular chambers having a plurality of axial rows and a plurality of circumferential rows.

6. The turbine of claim 1 wherein the chamber depth is between 3% and 20% of the vane diameter and wherein the clearance is less than 3% of the vane diameter.

* * * * *